United States Patent
Bay et al.

(10) Patent No.: US 11,763,835 B1
(45) Date of Patent: *Sep. 19, 2023

(54) VOICE CONTROLLED ASSISTANT WITH LIGHT INDICATOR

(71) Applicant: Amazon Technologies, Inc., Seattle, WA (US)

(72) Inventors: Daniel Christopher Bay, Santa Clara, CA (US); Ramy Sammy Sadek, San Jose, CA (US); Menashe Haskin, Kfar Vitkin (IL); Jason Zimmer, Santa Clara, CA (US); Robert Ramsey Flenniken, Burlingame, CA (US); Heinz-Dominik Langhammer, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/325,393

(22) Filed: May 20, 2021

Related U.S. Application Data

(63) Continuation of application No. 15/652,096, filed on Jul. 17, 2017, now Pat. No. 11,024,325, which is a
(Continued)

(51) Int. Cl.
*G10L 21/06* (2013.01)
*H04R 1/02* (2006.01)
(Continued)

(52) U.S. Cl.
CPC ................................. *G10L 21/06* (2013.01)

(58) Field of Classification Search
CPC .. H04R 1/028; H04R 1/345; H04R 2201/401; G06F 3/167; G10L 21/06
See application file for complete search history.

(56) References Cited

U.S. PATENT DOCUMENTS

| 4,689,554 A | 8/1987 | Schnaibel et al. |
| 5,459,312 A | 10/1995 | Gurner et al. |
| (Continued) | | |

FOREIGN PATENT DOCUMENTS

WO    WO2011088053 A2    7/2011

OTHER PUBLICATIONS

Office Action for U.S. Appl. No. 15/652,096, dated Jan. 22, 2020, Bay, "Voice Controlled Assistant with Light Indicator", 12 Pages.
(Continued)

*Primary Examiner* — Michael N Opsasnick
(74) *Attorney, Agent, or Firm* — Lee & Hayes, P.C.

(57) ABSTRACT

A voice controlled assistant has a housing to hold one or more microphones, one or more speakers, and various computing components. The housing has an elongated cylindrical body extending along a center axis between a base end and a top end. The microphone(s) are mounted in the top end and the speaker(s) are mounted proximal to the base end. A control knob is rotatably mounted to the top end of the housing to rotate about the center axis. A light indicator is arranged on the control knob to exhibit various appearance states to provide visual feedback with respect to the one or more functions being performed by the assistant. In one case, the light indicator is used to uniquely identify participants involved in a call.

20 Claims, 11 Drawing Sheets

Related U.S. Application Data continuation of application No. 13/830,257, filed on Mar. 14, 2013, now Pat. No. 9,721,586.

(51) Int. Cl.
    *G06F 3/06*     (2006.01)
    *H04R 1/34*     (2006.01)
    *H04R 1/00*     (2006.01)

(56) References Cited

U.S. PATENT DOCUMENTS

| | | | |
|---|---|---|---|
| 5,983,186 A | 11/1999 | Miyazawa et al. | |
| 6,243,685 B1 | 6/2001 | Welch et al. | |
| 6,324,514 B2 | 11/2001 | Matulich et al. | |
| 6,587,043 B1 | 7/2003 | Kramer | |
| 6,819,945 B1* | 11/2004 | Chow | H04W 76/15 |
| | | | 455/414.1 |
| 7,177,817 B1 | 2/2007 | Khosla et al. | |
| 7,212,827 B1* | 5/2007 | Veschl | H04W 68/00 |
| | | | 455/456.6 |
| 7,418,392 B1 | 8/2008 | Mozer et al. | |
| 7,693,758 B1 | 4/2010 | Bacco et al. | |
| 7,720,683 B1 | 5/2010 | Vermeulen et al. | |
| 7,774,204 B2 | 8/2010 | Mozer et al. | |
| 7,978,186 B2 | 7/2011 | Vassallo et al. | |
| 8,160,311 B1 | 4/2012 | Schaefer | |
| 8,461,443 B2 | 6/2013 | McKinney et al. | |
| 8,814,673 B1 | 8/2014 | Brunell et al. | |
| 8,890,953 B1 | 11/2014 | Coley | |
| 8,958,765 B2 | 2/2015 | Jarvinen et al. | |
| 9,002,930 B1* | 4/2015 | Want | H04L 69/14 |
| | | | 709/203 |
| 9,011,247 B2 | 4/2015 | Gronkowski et al. | |
| 9,141,150 B1 | 9/2015 | Trundle et al. | |
| 11,024,325 B1* | 6/2021 | Bay | H04R 1/345 |
| 2001/0015718 A1 | 8/2001 | Hinckley et al. | |
| 2002/0097848 A1 | 7/2002 | Wesemann et al. | |
| 2002/0107008 A1* | 8/2002 | Hendrey | H04W 76/40 |
| | | | 455/518 |
| 2003/0028382 A1 | 2/2003 | Chambers et al. | |
| 2003/0076843 A1 | 4/2003 | Holbrook et al. | |
| 2003/0118200 A1 | 6/2003 | Beaucoup et al. | |
| 2003/0149803 A1 | 8/2003 | Wilson | |
| 2004/0170086 A1 | 9/2004 | Mayer et al. | |
| 2004/0198398 A1* | 10/2004 | Amir | H04W 4/029 |
| | | | 455/412.2 |
| 2004/0212323 A1 | 10/2004 | Gutta et al. | |
| 2005/0141696 A1 | 6/2005 | Kato et al. | |
| 2005/0172154 A1* | 8/2005 | Short | H04M 3/42017 |
| | | | 726/5 |
| 2005/0192727 A1 | 9/2005 | Shostak et al. | |
| 2005/0200598 A1 | 9/2005 | Hayes et al. | |
| 2005/0207591 A1 | 9/2005 | Tsuji et al. | |
| 2005/0273218 A1 | 12/2005 | Breed et al. | |
| 2006/0025897 A1 | 2/2006 | Shostak et al. | |
| 2006/0028400 A1 | 2/2006 | Lapstun et al. | |
| 2006/0076908 A1 | 4/2006 | Morgan et al. | |
| 2006/0123150 A1 | 6/2006 | Iwai et al. | |
| 2006/0250382 A1 | 11/2006 | Lee et al. | |
| 2006/0256938 A1 | 11/2006 | Ruckart | |
| 2006/0262221 A1 | 11/2006 | Yuasa et al. | |
| 2007/0057781 A1 | 3/2007 | Breed | |
| 2007/0097204 A1 | 5/2007 | Gasper et al. | |
| 2007/0147601 A1 | 6/2007 | Tischer | |
| 2007/0155438 A1 | 7/2007 | Tischer | |
| 2007/0189026 A1 | 8/2007 | Chemel et al. | |
| 2007/0189480 A1 | 8/2007 | Salafia et al. | |
| 2007/0237321 A1 | 10/2007 | Bloebaum et al. | |
| 2007/0260886 A1 | 11/2007 | Dufour | |
| 2007/0291483 A1 | 12/2007 | Lys | |
| 2008/0001951 A1 | 1/2008 | Marks et al. | |
| 2008/0102783 A1 | 5/2008 | Bustamante | |
| 2008/0137893 A1 | 6/2008 | Ross et al. | |
| 2008/0148109 A1 | 6/2008 | Bashor et al. | |
| 2008/0265797 A1 | 10/2008 | Van Doorn et al. | |
| 2009/0004973 A1 | 1/2009 | Andrews et al. | |
| 2009/0043580 A1 | 2/2009 | Mozer et al. | |
| 2009/0052684 A1 | 2/2009 | Ishibashi | |
| 2009/0108067 A1 | 4/2009 | Roquemore | |
| 2009/0109020 A1 | 4/2009 | Tischer | |
| 2009/0143057 A1* | 6/2009 | Arun | H04M 3/42 |
| | | | 455/418 |
| 2009/0146583 A1 | 6/2009 | Bhadri et al. | |
| 2009/0196016 A1 | 8/2009 | Massara et al. | |
| 2009/0207590 A1 | 8/2009 | Tsung | |
| 2009/0251620 A1 | 10/2009 | Mortensen | |
| 2009/0303073 A1 | 12/2009 | Gilling et al. | |
| 2010/0071535 A1 | 3/2010 | MckKnney et al. | |
| 2010/0109536 A1 | 5/2010 | Jung et al. | |
| 2010/0213876 A1 | 8/2010 | Adamson et al. | |
| 2011/0051907 A1 | 3/2011 | Jaiswal et al. | |
| 2011/0099476 A1 | 4/2011 | Snook et al. | |
| 2011/0197070 A1 | 8/2011 | Mizrah | |
| 2012/0009995 A1 | 1/2012 | Osgood | |
| 2012/0169777 A1 | 7/2012 | Budni et al. | |
| 2012/0223885 A1 | 9/2012 | Perez | |
| 2012/0249797 A1 | 10/2012 | Haddick et al. | |
| 2012/0281057 A1 | 11/2012 | Couse | |
| 2012/0289291 A1 | 11/2012 | Moran et al. | |
| 2013/0005458 A1 | 1/2013 | Kosta et al. | |
| 2013/0184078 A1 | 7/2013 | Brunell et al. | |
| 2013/0208103 A1 | 8/2013 | Sands et al. | |
| 2013/0217351 A1 | 8/2013 | Jarvinen et al. | |
| 2014/0056421 A1 | 2/2014 | Gandhi et al. | |
| 2014/0063055 A1 | 3/2014 | Osterhout et al. | |

OTHER PUBLICATIONS

Final Office Action dated Feb. 8, 2019 for U.S. Appl. No. 15/685,398 "Visual Indication of an Operational State" Blankensteen, 19 pages.
Office Action for U.S. Appl. No. 13/830,257, dated Feb. 24, 2015, Daniel Christopher Bay, "Voice Controlled Assistant with Light Indicator", 8 pages.
Office Action for U.S. Appl. No. 15/652,096, dated Apr. 10, 2020, Bay, "Voice Controlled Assistant with Light Indicator", 9 Pages.
Office action for U.S. Appl. No. 13/561,840 dated Aug. 26, 2016, Blanksteen et al., "Visual Indication of an Operational State", 21 pages.
Office action for U.S. Appl. No. 13/743,282, dated Jan. 20, 2017, Bezos et al., "Visual Indication of an Operational State", 19 pages.
Final Office Action dated Oct. 4, 2019 for U.S. Appl. No. 15/685,398 "Visual Indication of an Operational State" Blanksteen, 20 pages.
Office action for U.S. Appl. No. 13/830,257, dated Dec. 15, 2016, Bay et al., "Voice Controlled Assistant with Light Indicator", 6 pages.
Office action for U.S. Appl. No. 13/561,840, dated Dec. 31, 2015, Blanksteen et al., "Visual Indication of an Operational State", 22 pages.
Office Action for U.S. Appl. No. 15/685,398, dated Mar. 28, 2018, Blanksteen, "Visual Indication of an Operational State", 17 pages.
Office action for U.S. Appl. No. 13/830,257, dated Mar. 29, 2016, Bay et al., "Voice Controlled Assistant with Light Indicator", 11 pages.
Office action for U.S. Appl. No. 13/561,840 dated Mar. 7, 2017, Blanksteen et al., "Visual Indication of an Operational State", 22 pages.
Office action for U.S. Appl. No. 13/743,282, dated Apr. 4, 2016, Bezos et al., "Visual Indication of an Operational State", 17 pages.
Office Action for U.S. Appl. No. 13/561,840 dated Jun. 23, 2015, Scott I. Blankesteen, "Visual Indication of an Operational State", 16 pages.
Office Action for U.S. Appl. No. 15/685,398, dated Jun. 25, 2019, Blanksteen, "Visual Indication of an Operational State", 18 pages.
Office Action for U.S. Appl. No. 15/652,096, dated Jul. 19, 2019, Bay, "Voice Controlled Assistant with Light Indicator", 10 pages.
Office action for U.S. Appl. No. 13/743,282, dated Aug. 10, 2016, Bezos et al., "Visual Indication of an Operational State", 17 pages.
Office action for U.S. Appl. No. 13/743,282, dated Aug. 12, 2015, Bezos et al., "Visual Indication of an Operational State", 13 pages.

(56) References Cited

OTHER PUBLICATIONS

Office action for U.S. Appl. No. 13/830,257, dated Sep. 21, 2016, Bay et al., "Voice Controlled Assistant with Light Indicator", 7 pages.
Office Action for U.S. Appl. No. 15/685,398, dated Sep. 25, 2017, Scott I. Blankesteen, "Visual Indication of an Operational State", 15 pages.
Office action for U.S. Appl. No. 13/561,840 dated Aug. 26, 2016, Blanksteen et al., "Visual Indication of an Operational State", 19 pages.
Office action for U.S. Appl. No. 13/830,257 dated Sep. 8, 2015, Bay et al., "Voice Controlled Assistant with ight Indicator", 8 pages.
Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

ABSTRACT

VOICE CONTROLLED ASSISTANT WITH LIGHT INDICATOR

CROSS REFERENCE TO RELATED APPLICATIONS

This application is a continuation of and claims priority to U.S. patent application Ser. No. 15/652,096, filed Jul. 17, 2017, which is a continuation of and claims priority to U.S. patent application Ser. No. 13/830,257, filed Mar. 14, 2013, now U.S. Pat. No. 9,721,586, issued Aug. 1, 2017, which are incorporated herein by reference.

BACKGROUND

Homes are becoming more connected with the proliferation of computing devices such as desktops, tablets, entertainment systems, and portable communication devices. As these computing devices evolve, many different ways have been introduced that allow users to interact with computing devices, such as through mechanical devices (e.g., keyboards, mice, etc.), touch screens, motion, and gesture. Another way to interact with computing devices is through speech.

To implement speech interaction, a device is commonly equipped with a microphone to receive voice input from a user and a speech recognition component to recognize and understand the voice input. The device also commonly includes a speaker to emit audible responses to the user. With speech interaction, the device may be operated essentially "hands free". For some operations, however, voice operation may not be intuitive or easily implemented. Furthermore, in some applications, audio responses may not be sufficient for the desired user experience.

Accordingly, there is a continuing need for improved designs of voice enabled devices that are intuitive and easy to operate and that provide different forms of responses to enhance user experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
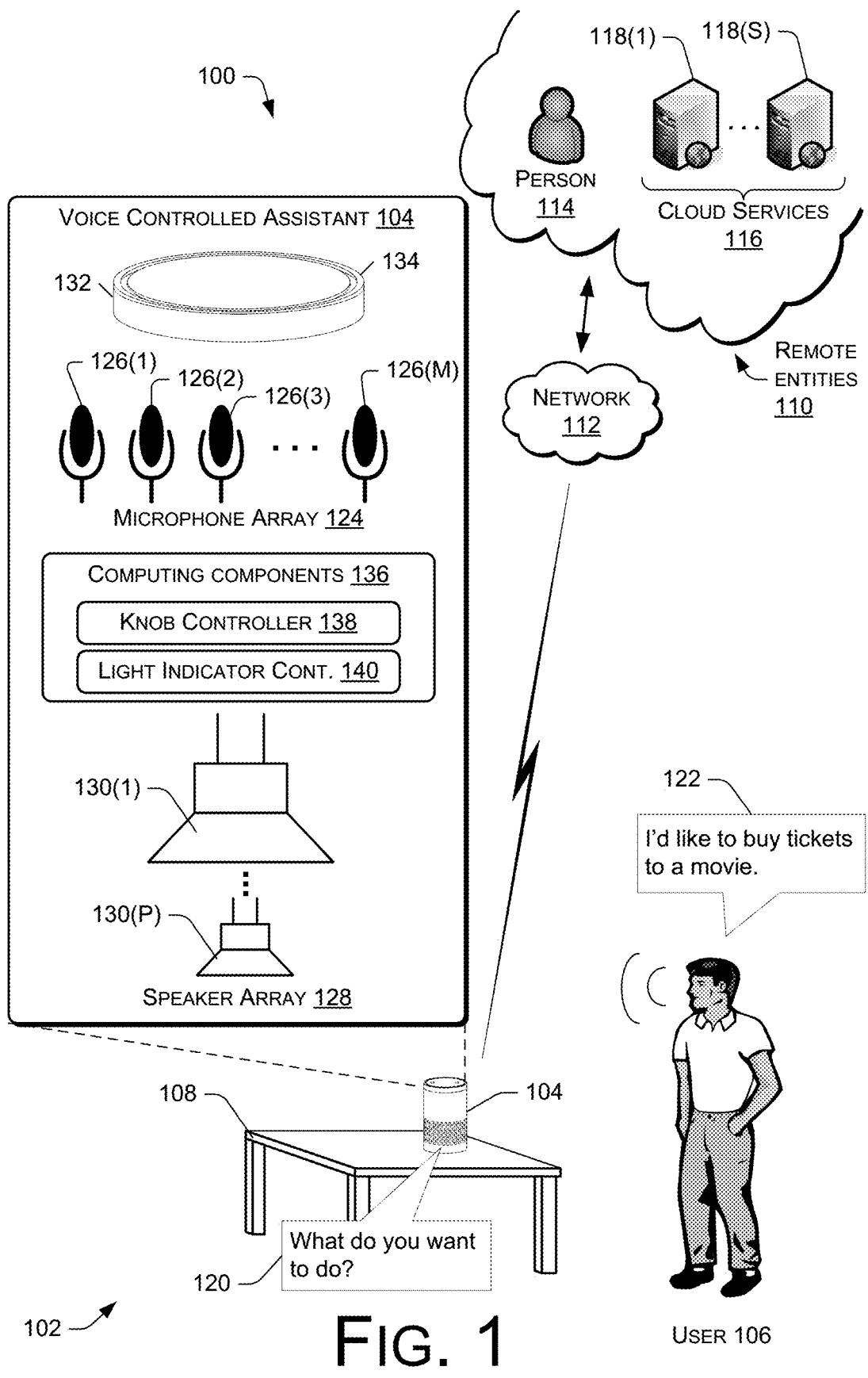
FIG. 1 shows an illustrative voice interactive computing architecture set in an example environment that includes a near end talker communicating with a far end talker or cloud service through use of a voice controlled assistant.

A voice controlled assistant having a light indicator is described. In one implementation, the light indicator is formed as part of an integrated manual control knob. The voice controlled assistant is discussed in the context of an architecture in which the assistant is connected to far end talkers or a network accessible computing platform, or "cloud service", via a network. The voice controlled assistant may be implemented as a hands-free device equipped with a wireless LAN (WLAN) interface. The voice controlled assistant relies primarily, if not exclusively, on voice interactions with a user. However, for certain operations, the manual control knob provides an intuitive mechanical means for user input and the light indicator facilitates intuitive and useful non-audio feedback to enhance user experience.

To illustrate one example usage scenario, the voice controlled assistant may be positioned in a room (e.g., at home, work, store, etc.) to receive user input in the form of voice interactions, such as spoken requests or a conversational dialogue. Depending on the request, the voice controlled assistant may perform any number of actions or functions. For instance, the assistant may play music or emit verbal answers to the user. The assistant may alternatively function as a communication device to facilitate network voice communications with a far end talker. As still another alternative, the user may ask a question or submit a search request to be performed by a remote cloud service. For instance, the user's voice input may be transmitted from the assistant over a network to the cloud service, where the voice input is interpreted and used to perform a function. In the event that the function creates a response, the cloud service transmits the response back over the network to the assistant, where it may be audibly emitted to the user.

When using speech as the primary interaction, however, the user may encounter situations when the hands-free device is not as intuitive or easy to operate as might be expected or desired. For instance, suppose the user is in the midst of a conversation using the voice controlled assistant and the user would like to adjust the volume of the audio output. In a purely voice controlled mode of operation, the device expects to receive the command vocally. However, it may be difficult for the device to differentiate between words in the conversation and a volume control command. To alleviate this potential confusion, the voice controlled assistant is constructed with an integrated control knob that allows the user to make certain adjustments manually through use of the knob. For instance, the user may adjust the volume via the control knob while conducting the verbal conversation.

Furthermore, in some contexts, exclusive audio feedback may not be suitable. For instance, when the user is in the midst of a conversation, an audio signal or indication may be inappropriate because it interrupts the conversation, or may even go undetected by the user. Accordingly, the voice controlled assistant is further constructed with a light indicator to convey visual, non-audio messages or feedback to the user. The light indicator may be configured to provide multiple different types of indications. In one implementation, the light indicator is constructed to emit multi-color light from multiple segments according to any on/off, intensity differences, or animation/sequencing pattern, thereby providing an essentially unlimited variety of indications.

In one particular scenario, the voice controlled assistant may be used to facilitate a phone conversation, either by itself or in conjunction with a phone (e.g., cellular phone, smart phone, etc.). In this scenario, the light indicator may be used to identify the person who is calling or the intended recipient of the call. For instance, the light indicator may exhibit different colors or patterns for different callers or recipients. When a call is received, the light indicator emits a unique visual appearance state associated with the caller and/or recipient.

In another particular scenario, the voice controlled assistant is equipped with a light indicator may be used as a visualization and warning device. For instance, the light indicator may be programmed to display custom notification patterns to either warn or inform a user. Messages intended for a particular user would result in a custom visual appearance of the light indicator. The visual appearance may not only identify the target recipient, but also the sender of the message.

The architecture may be implemented in many ways. Various example implementations are provided below. However, the architecture may be implemented in many other contexts and situations different from those shown and described below.

FIG. 1 shows an illustrative architecture 100, set in an exemplary environment 102, which includes a voice controlled assistant 104. In this example, the environment may be a room or an office, and a user 106 is present to interact with the voice controlled assistant 104. Although only one user 106 is illustrated in FIG. 1, multiple users may use the voice controlled assistant 104. The user 106 may be located proximal to the voice controlled assistant 104, and hence serve as a near end talker in some contexts.

In this illustration, the voice controlled assistant 104 is physically positioned on a table 108 within the environment 102. The voice controlled assistant 104 is shown sitting upright and supported on its base end. In other implementations, the assistant 104 may be placed in any number of locations (e.g., ceiling, wall, in a lamp, beneath a table, on a work desk, in a hall, under a chair, etc.). The voice controlled assistant 104 is shown communicatively coupled to remote entities 110 over a network 112. The remote entities 110 may include individual people, such as a person 114, or automated systems (not shown) that serve as far end talkers to verbally interact with the user 106. The remote entities 110 may alternatively comprise cloud services 116 hosted, for example, on one or more servers 118(1), . . . , 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 104, and produce a suitable response. Example applications might include web browsing, online shopping, banking, email, work tools, productivity, entertainment, educational, and so forth.

In FIG. 1, the user 106 is shown communicating with the remote entities 110 via the voice controlled assistant 104. In the illustrated scenario, the voice controlled assistant 104 outputs an audible question, "What do you want to do?" as represented by dialog bubble 120. This output may represent a question from a far end talker 114, or from a cloud service 116 (e.g., an entertainment service). The user 106 is shown replying to the question by stating, "I'd like to buy tickets to a movie" as represented by the dialog bubble 122. In some implementations, the voice controlled assistant 104 is equipped with a text-to-speech (TTS) engine that generates voice audio output from text-based content received from the remote entities 110. This TTS engine may, in other implementations, be located at the remote entities 110 to convert the text content to an audio output signal, which is then transmitted to the voice controlled assistant 104.

The voice controlled assistant 104 is equipped with an array 124 of microphones 126(1), . . . , 126(M) to receive the voice input from the user 106 as well as any other audio sounds in the environment 102. The microphones 126(1)-(M) are generally arranged at a first or top end of the assistant 104 opposite the base end seated on the table 108, as will be described in more detail with reference to FIGS. 3, 6, and 7. Although multiple microphones are illustrated, in some implementations, the assistant 104 may be embodied with only one microphone.

The voice controlled assistant 104 may further include a speaker array 128 of speakers 130(1), . . . , 130(P) to output sounds in humanly perceptible frequency ranges. The speakers 130(1)-(P) may be configured to emit sounds at various frequency ranges, so that each speaker has a different range. In this manner, the assistant 104 may output high frequency signals, mid frequency signals, and low frequency signals. The speakers 130(1)-(P) are generally arranged at a second or base end of the assistant 104 and oriented to emit the sound in a downward direction toward the base end and opposite to the microphone array 124 in the top end. One particular arrangement is described below in more detail with reference to FIG. 7. Although multiple speakers are illustrated, the assistant 104 may be embodied with only one speaker in other implementations.

The voice controlled assistant 104 is further configured with a control knob 132 to control any number of aspects, such as volume, treble, base, radio band selection, menu navigation, and so forth. The control knob 132 permits manual adjustment without use of verbal commands. For instance, the user can adjust volume while conducting a contemporaneous verbal conversation. The control knob is described below in more detail with reference to FIGS. 3-5 and 7.

The voice controlled assistant 104 may further include a light indicator 134 to provide non-audio, visual indications to the user. In one implementation, the light indicator 134 is integrated with the control knob 132, such as a light edge pipe around an externally exposed lip or edge of the control knob 132 to permit viewing from all directions. The light indicator 134 may be configured with multiple LEDs to provide multiple colored light segments that can be actively controlled to exhibit essentially any color, sequence, or effect. The light indicator 134 may be used to provide visual cues or feedback to the user. Various functions or activities may be programmatically associated with different indication or appearance states of the light indicator 134. For instance, the light indicator 134 may take on a first appearance (e.g., solid green color) when the assistant 104 is active and awaiting input, and a second appearance (e.g., solid red color) when a pending message has been received. The light indicator 134 may further produce a third appearance (e.g., flashing color) when providing a notice or warning to the user and a fourth appearance (e.g., sequential clockwise/counterclockwise on/off pattern) when the user is adjusting the control knob. Other examples of possible events that may be assigned to various appearances of the light indicator include alerts, reminders, calendar events, call waiting, arrival of a message (e.g., voicemail, email, text, etc.), mute on/off, recording active, security event (e.g., detecting a presence of an intruder through audible sound), amplitude of speaker's voice, direction of voice source, power, connection to a Wi-Fi network, weather (e.g., temperature, pressure, etc.), timer, and so forth. A more detailed of one particular configuration of the light indicator is described below with reference to FIGS. 3 and 7-9.

The voice controlled assistant 104 may further include computing components 136 that process the voice input received by the microphone array 124, enable communication with the remote entities 110 over the network 112, and generate the audio to be output by the speaker array 128. The computing components 136 are generally positioned between the microphone array 124 and the speaker array 128, although essentially any other arrangement may be used. One collection of additional computing components 136 are illustrated and described with reference to FIG. 2.

Among the computing components 136 are a knob controller 138 and a light indicator controller 140. The knob controller receives input from the manual control knob 132 that is rotatably mounted on the assistant 104. The knob controller 138 translates the mechanical movement of the knob to a control signal for controlling any number of aspects, such as volume, treble, base, radio band selection, menu navigation, and so forth. The light indicator controller 140 controls operation of the light indicator 134. More specifically, the light indicator controller 140 programmatically associates various functions with the different indication states that the light indicator 134 can exhibit. If the light indicator 134 is a multi-color, multi-segment indicator, the controller 140 may further determine which ring segments to illuminate, which colors to use, a timing to illuminate the segments, and whether to follow a pattern, sequence, or animation.

Figure 2:
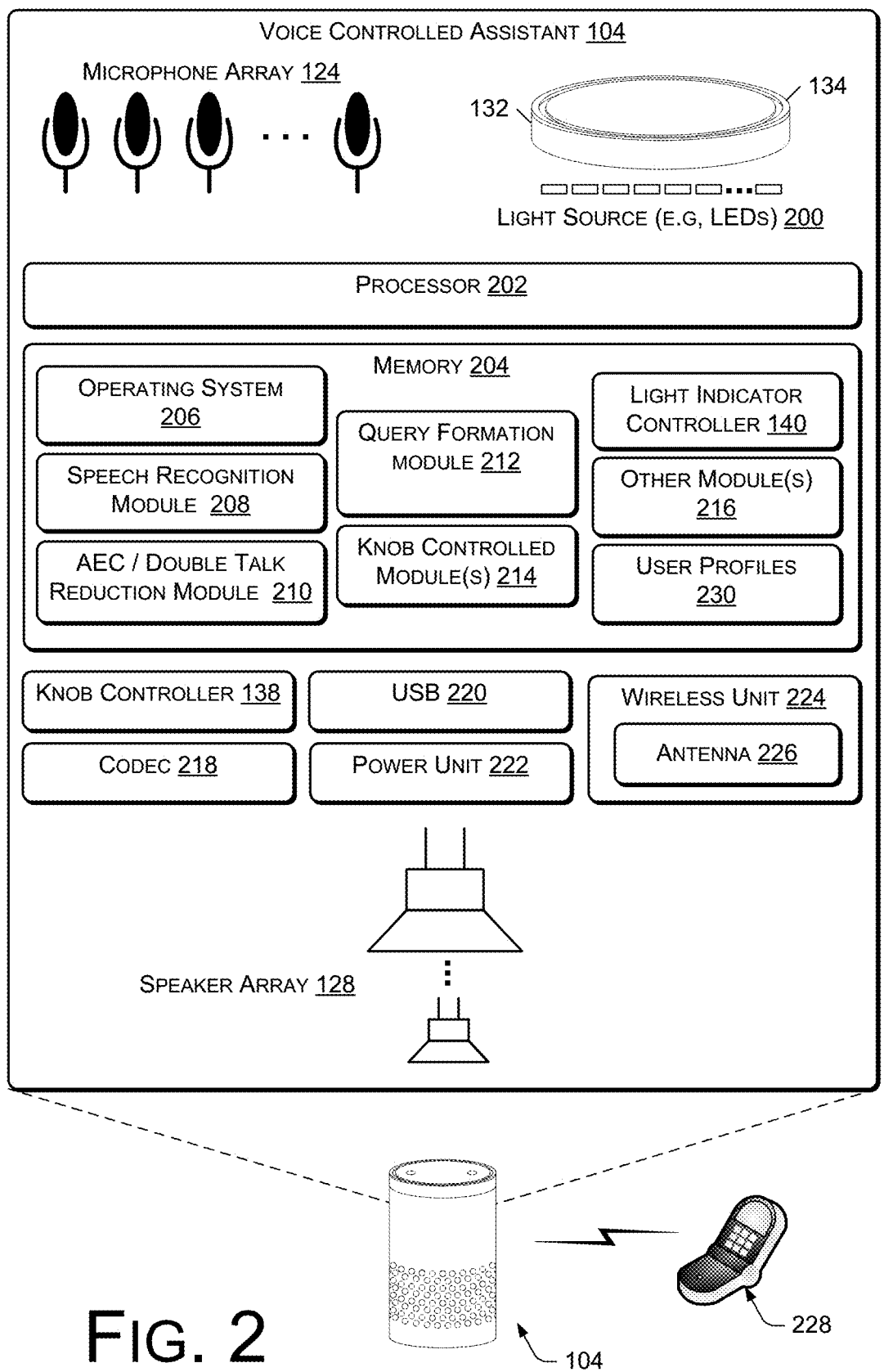
FIG. 2 shows a block diagram of selected functional components implemented in the voice controlled assistant of FIG. 1.

FIG. 2 shows selected functional components of the voice controlled assistant 104 in more detail. Generally, the voice controlled assistant 104 may be implemented as a standalone device that is relatively simple in terms of functional capabilities with limited input/output components, memory, and processing capabilities. For instance, the voice controlled assistant 104 may not have a keyboard or keypad. Nor does it have a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the voice controlled assistant 104 includes the microphone array 124, the speaker array 128, a control knob 132, a light indicator 134 as described above with respect to FIG. 1. The microphone array 124 may be used to capture speech input from the user 106, or other sounds in the environment 102. The speaker array 128 may be used to output speech from a far end talker, audible responses provided by the cloud services, forms of entertainment (e.g., music, audible books, etc.), or any other form of sound. The speaker array 128 may output a wide range of audio frequencies including both human perceptible frequencies and non-human perceptible frequencies. The control knob 132 permits manual input for various assignable activities, and the light indicator 134 provides visual, non-audio feedback to the user. In the illustrated implementation, the light indicator 134 includes an edge pipe provided at an outer lip of the control knob 132 and a light source 200 optically coupled to deliver light to the edge pipe. The light source 200 may be comprised of one or more light emitting diodes (LEDs), which may further be multi-color LEDs. In one implementation, the light indicator has twelve LEDs 200 that provide twelve distinct color segments that are individually controllable.

The voice controlled assistant 104 further includes a processor 202 and memory 204. The processor 202 may be implemented as any form of processing component, including a microprocessor, control logic, application-specific integrated circuit, and the like. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the assistant 104 for the benefit of other modules. Several other modules may be provided to process verbal input from the user 106. For instance, a speech recognition module 208 provides some level of speech recognition functionality. In some implementations, this functionality may be limited to specific commands that perform fundamental tasks like waking up the device, configuring the device, and the like. The amount of speech recognition capabilities implemented on the assistant 104 is an implementation detail, but the architecture described herein can support having some speech recognition at the local assistant 104 together with more expansive speech recognition at the cloud services 116.

An acoustic echo cancellation (AEC) and double talk reduction module 210 are provided to process the audio signals to substantially cancel acoustic echoes and substantially reduce double talk that may occur. This module 210 may, for example, identify times where echoes are present, where double talk is likely, where background noise is present, and attempt to reduce these external factors to isolate and focus on the near talker. By isolating on the near talker, better signal quality is provided to the speech recognition module 208 to enable more accurate interpretation of the speech utterances.

A query formation module 212 may also be provided to receive the parsed speech content output by the speech recognition module 208 and to form a search query or some form of request. This query formation module 212 may utilize natural language processing (NLP) tools as well as various language modules to enable accurate construction of queries based on the user's speech input.

One or more knob controlled modules 214 may also be stored in the memory 204 to receive control signals from the knob controller 138 and modify operation of corresponding applications or functionality. Examples of knob-controlled modules 214 may include modules that facilitate volume control, other audio control (e.g., base, treble, etc.), menu navigation, radio band selection, and so forth.

The light indicator controller 140 may also be implemented to execute on the processor 202 to assign various functions to corresponding indication states exhibited by the light indicator 134. More specifically, the light indicator controller 140 individually controls each of the LEDs 200 to provide any number of visual appearances for the light indicator 134. The light indicator controller determines which of the LEDs 200 to illuminate, when individual LEDs should be illuminated, their respective color, and whether to apply a pattern or animation effect.

The modules shown stored in the memory 204 are merely representative. Other modules 216 for processing the user voice input, interpreting that input, and/or performing functions based on that input may be provided.

The voice controlled assistant 104 might further include a codec 218 coupled to the microphones of the microphone array 124 and the speakers of the speaker array 128 to encode and/or decode the audio signals. The codec 218 may convert audio data between analog and digital formats. A user may interact with the assistant 104 by speaking to it, and the microphone array 124 captures the user speech. The codec 218 encodes the user speech and transfers that audio data to other components. The assistant 104 can communicate back to the user by emitting audible statements passed through the codec 218 and output through the speaker array 128. In this manner, the user interacts with the voice controlled assistant simply through speech, without use of a keyboard or display common to other types of devices.

A USB port 220 may further be provided as part of the assistant 104 to facilitate a wired connection to a network, or a plug-in network device that communicates with other wireless networks. In addition to the USB port 220 or as an alternative thereto, other forms of wired connections may be employed, such as a broadband connection. A power unit 222 is further provided to distribute power to the various components on the assistant 104.

The voice controlled assistant 104 includes a wireless unit 224 coupled to an antenna 226 to facilitate a wireless connection to a network. The wireless unit 224 may implement one or more of various wireless technologies, such as Wi-Fi, Bluetooth, RF, and so on. In one implementation, the wireless unit 224 configured with a short range wireless technology (e.g., Bluetooth) may be used to communicate with other local devices, such as a communication device 228 (e.g., portable digital assistant, cellular phone, smart phone, etc.). As one example, a voice communication device 228 may be proximal to the voice controlled assistant 104 and communicate with the assistant using a Bluetooth connection. When the communication device 228 receives a call, the call may be transferred to the voice controlled assistant 104 to facilitate the conversation with the user. As part of this incoming call, the calling party may be identified and that identity is used by the voice controlled assistant 104 to illuminate the light indicator in a visually customized way that informs the user of the calling party. Additionally, the intended recipient may be identified and the assistant 104 may illuminate the light indicator in a different appearance state associated with the recipient. In this manner, the light indicator functions as a caller ID.

In one implementation, user profiles 230 are maintained in the memory 204. The user profiles 230 may include a user name, an identifier, an email address, a phone number, and the like. Also, each user profile includes an appearance state for the light indicator. In this manner, the appearance state is associated with a corresponding user so that information about a user (e.g., name, phone number, etc.) may be used to retrieve the appropriate appearance state. In certain cases, the appearance state is unique to a single user. In other cases, the appearance state may be used to represent an entity or group of users (e.g., grandparents). As shown in FIG. 2, upon receipt of an incoming call, the phone 228 may transfer any part of the user metadata to the assistant 104, such as the name, phone number, and so forth. The assistant 104 uses this information to retrieve the associated appearance state from the user profile 230. Once the appearance state is retrieved, the processor 202 instructs the light indicator to emit the appearance state.

The voice controlled assistant 104 is designed to support audio interactions with the user, in the form of receiving voice commands (e.g., words, phrase, sentences, etc.) from the user and outputting audible feedback to the user. Accordingly, in the illustrated implementation, there are no keypads, joysticks, keyboards, touch screens, and the like. Further there is no display for text or graphical output. In one implementation described below, the voice controlled assistant 104 includes a few control mechanisms, such as the knob 132, two actuatable buttons, and possibly power and reset buttons. But, otherwise, the assistant 104 relies primarily on audio interactions.

Accordingly, the assistant 104 may be implemented as an aesthetically appealing device with smooth and rounded surfaces, with apertures for passage of sound waves, and merely having a power cord and optionally a wired interface (e.g., broadband, USB, etc.). In some implementations, a power light may be included at the base or bottom of the assistant 104 to indicate when the device is powered on. An on/off power switch may further be included in some configurations.

In the illustrated implementation, the assistant 104 has a housing of an elongated cylindrical shape. Apertures or slots are formed in a base end to allow emission of sound waves. A more detailed discussion of one particular structure is provided below with reference to FIGS. 3-7. Once plugged in, the device may automatically self-configure, or with slight aid of the user, and be ready to use. As a result, the assistant 104 may be generally produced at a low cost. In other implementations, other I/O components may be added to this basic model, such as additional specialty buttons, a keypad, display, and the like.

Figure 3:
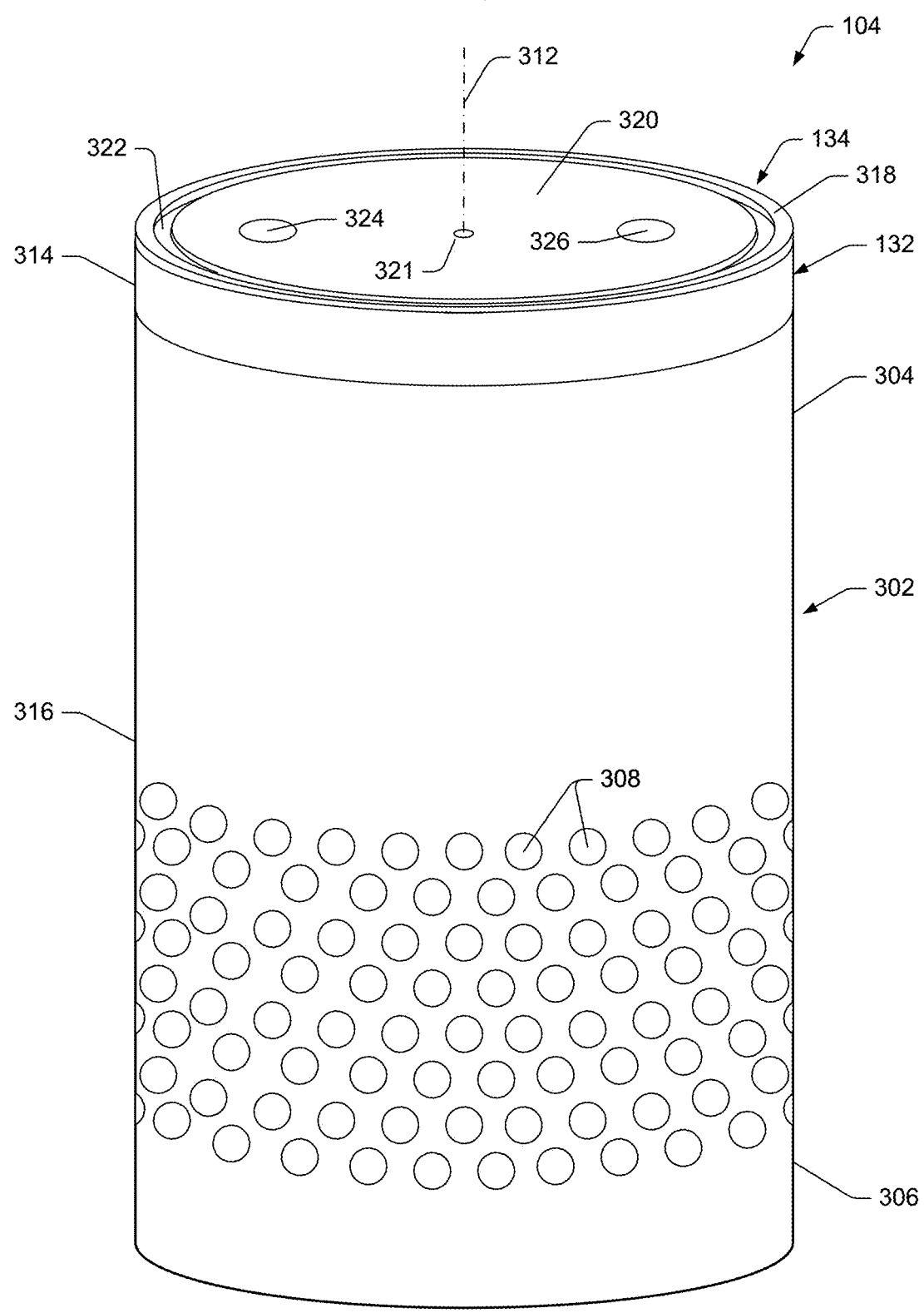
FIG. 3 is a perspective view of one implementation of the voice controlled assistant of FIG. 1 to illustrate a control knob integrated with a cylindrical housing of the voice controlled assistant, and a light indicator arranged at an upper edge of the control knob.

FIG. 3 is a perspective view of one example implementation of the voice controlled assistant 104. The assistant 104 has a cylindrical body or housing 302 with an upper or top end 304 and a lower or base end 306. The base end 306 of the housing 302 has multiple openings or apertures 308 to permit emission of sound waves generated by the speakers (not shown in FIG. 3) contained within the housing. In other implementations, the openings 308 may be in other locations, such as a band about the middle of the cylindrical housing or closer to the top end 304. The openings 308 may be arranged in any layout or pattern, essentially anywhere on the device, depending in part on the location of the one or more speakers housed therein.

One implementation of the control knob 132 is illustrated in FIG. 3 as an annular wheel-like knob mounted near the top end 304 of the housing 302 to rotate about a center axis 312 of the cylindrical body defining the housing. The knob 132 has a smooth outer surface 314 that is substantially flush with an outer surface 316 of the housing 302. For instance, the housing's outer surface 316 is at a first radius from the center axis 312 and the knob's outer surface 314 is at a second radius from the center axis 312, and the first and second radii are approximately equal. In this manner, the knob 132 maintains the smooth cylindrical shape of the housing 302 to promote an elegant design where the knob 132 seamlessly integrates with the cylindrical housing 302 and does not conspicuously stand out as a separate appendage. Additionally, the knob 132 enjoys a large diameter to permit more precise mechanical movement and control. The knob 132 may be infinitely rotatable in either direction, with no mechanical limit for clockwise or counterclockwise rotation. As a result, a user may easily and finely control various functions by grasping and turning the knob 132 or by using a finger to rotate the knob 132.

The knob 132 has an upper edge or lip that is fitted with an edge pipe 318, which may be used as an annular illumination component of the light indicator 134. The edge pipe 318 is formed of a light transmissive material and may receive light from the light source 200 (e.g., one or more LEDs) so that the edge pipe 318 may be illuminated. Due to its location at the top end 304, the edge pipe 318, when illuminated, is visible from all directions and may be easily seen in the dark to aid in user operation of the knob 132. The edge pipe 318 may be illuminated using a single color or many different colors. Similarly, the pipe 318 may be illuminated as a solid annular ring or as individual segments. The segments may even be controlled in a way to provide an animated appearance (e.g., flashing segments, turning segments on/off in a pattern, differing intensities of light emitted by the LEDs, etc.). The various appearances may be assigned to different functions, such as to differentiate rest mode from operational mode, or to communicate different states of operation (e.g., when in mute or privacy), or to communicate different types of functionality (e.g., receiving or storing a message), or to illustrate associated knob operation (e.g., illuminating more segments as the user turns the knob), and so forth.

Figure 4:
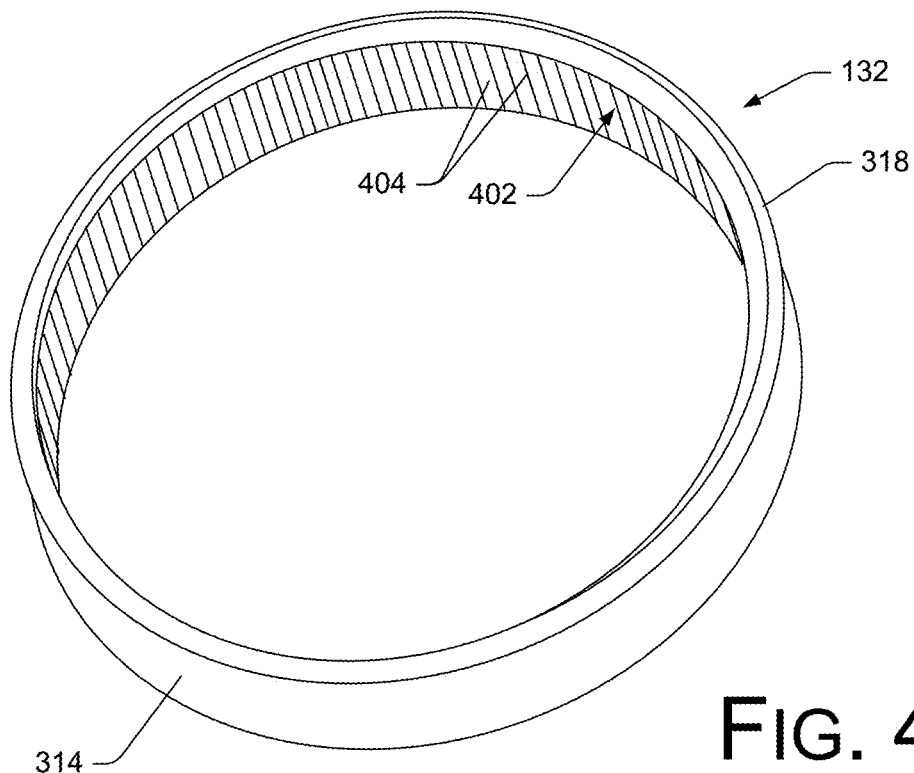
FIG. 4 shows one example implementation of the control knob of FIG. 3 in more detail.

FIG. 4 shows the control knob 132 of FIG. 3 in more detail. The knob 132 is an annular ring member having an outer surface 314 and an inner surface 402. In one implementation, the knob is constructed with a thickness between the inner surface 402 and the outer surface 314 and an overall weight that provides a quality tactile experience with improved precision feel. The edge pipe 318 is arranged around one edge or lip of the knob 132. The inner surface 402 has a set of gear teeth 404 that engage a complementary gear member internal to the knob 132.

Figure 5:
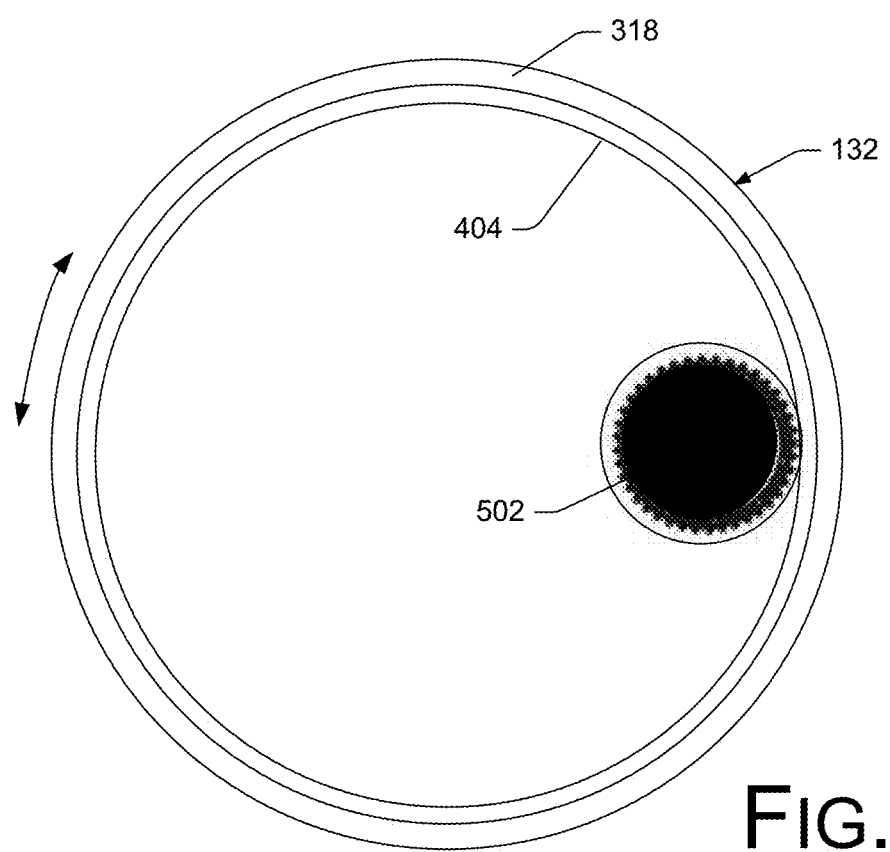
FIG. 5 shows one example implementation of the control knob of FIG. 3 integrated with complementary internal gearing within the voice controlled assistant.

FIG. 5 shows one example mechanical arrangement in which the knob 132 engages a complementary gear member 502. Rotation of the knob 132, either clockwise or counterclockwise, causes mechanical movement of the inner gear teeth 404 relative to the complementary gear member 502, which in turn rotates the gear member 502 in the same direction. The gear member 502 is operationally coupled to the knob controller 138 that generates an electrical signal based on the movement of the gear member 502.

With reference again to FIG. 3, the knob 132 rotates around a circular end cap 320, which remains stationary. The circular end cap 320 may be formed of a hard, protective material, such as plastic. In such implementations, a center hole 321 may be provided in the end cap 320 to permit sound transmission to one or more microphones positioned beneath the end cap 320. Alternatively, the end cap 320 may be formed of a material that is transmissive to sound waves, as one or more microphones may be placed beneath the surface. In one implementation, a groove 322 is formed between the edge pipe 318 of the knob 132 and the end cap 320. The groove 322 recesses into the assistant from the outer surface formed by the end cap 320. The groove 322 may be, for example, at a depth of 1 mm to 5 mm, with 2 mm being one example suitable distance. In still another implementation, a sound transmissive material, such as a mesh, may be used to cover the groove 322 or components, such as microphones, positioned in the groove.

Two actuatable buttons 324 and 326 are exposed through corresponding openings in the end cap 318. These buttons 324 and 326 may be implemented, for example, with on/off states and may be assigned to control essentially any binary functionality. In one implementation, the left button 324 may be used to enable/disable the microphones (i.e., place the assistant in a privacy mode) and the right button 326 may be used for any other assignable function. The buttons 324 and 326 may be configured with different tactile profiles (e.g., different surfaces, shapes, texture, etc.) to exhibit different tactile experiences for the user, so that the buttons may be identified in low or dark lighting conditions simply through touch. The buttons may also be configured to be illuminated for easy viewing in low or dark lighting conditions.

One or more microphones may be positioned in the groove 322. There are many possible arrangements of the microphones in the microphone array. In one implementation, the assistant 104 is equipped with six microphones in the groove 322 between the knob 132 and the end cap 320 and a seventh microphone is positioned centrally at the axis 312 beneath the surface of the end cap 320. If the end cap 320 is formed of a hard, protective plastic, an aperture or opening 321 may be formed at the center point above the seventh microphone. Alternatively, a hole pattern may be stamped into the plastic end cap 320 to generally permit passage of sound waves to the underlying microphones.

Figure 6:
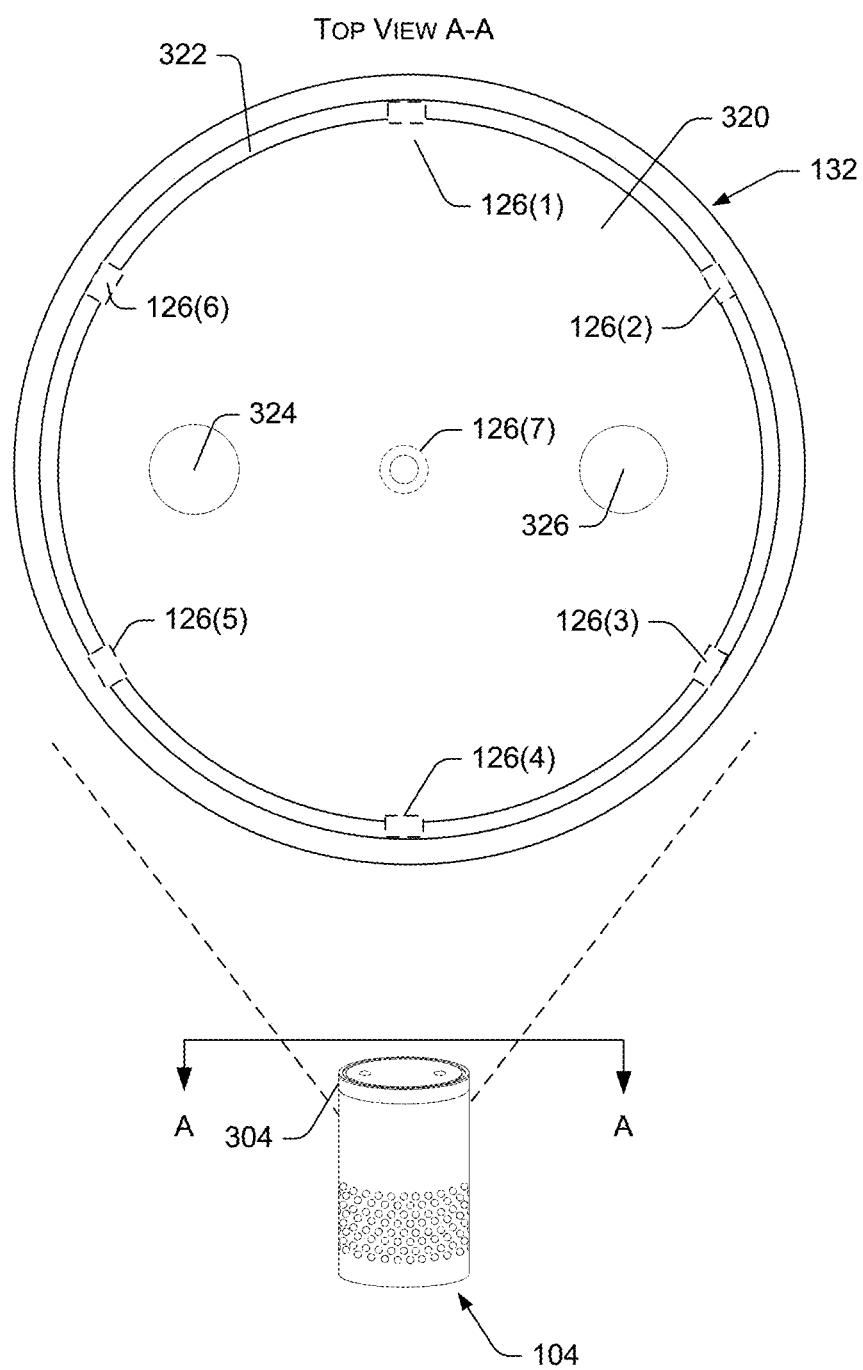
FIG. 6 shows a top down view of the voice controlled assistant of FIG. 3 to illustrate a light edge pipe arranged on the control knob and an example arrangement of microphones to form a microphone array.

FIG. 6 shows one example arrangement of microphones in the top end 304. More particularly, FIG. 6 shows a top down view of the voice controlled assistant 104 taken along line A-A to illustrate the end cap 320 at the upper end 304 of the housing 302. In this example, the microphone array has seven microphones 126(1), . . . , 126(7). Six of the microphones 126(1)-(6) are placed within the groove 322 between the perimeter of the end cap 320 and the knob 132, and are oriented so that the microphones are exposed into the groove 322 to receive sound. A mesh or other sound transmissive material may be placed over the microphones to prevent dust or other contaminants from affecting the microphones. A seventh microphone 126(7) is positioned at the center point of the circular end cap 320 and beneath an opening in the end cap 320 or a sound transmissive material. It is noted that this is merely one example arrangement. Arrays with more or less than seven microphones may be used, and other layouts are possible.

Figure 7:
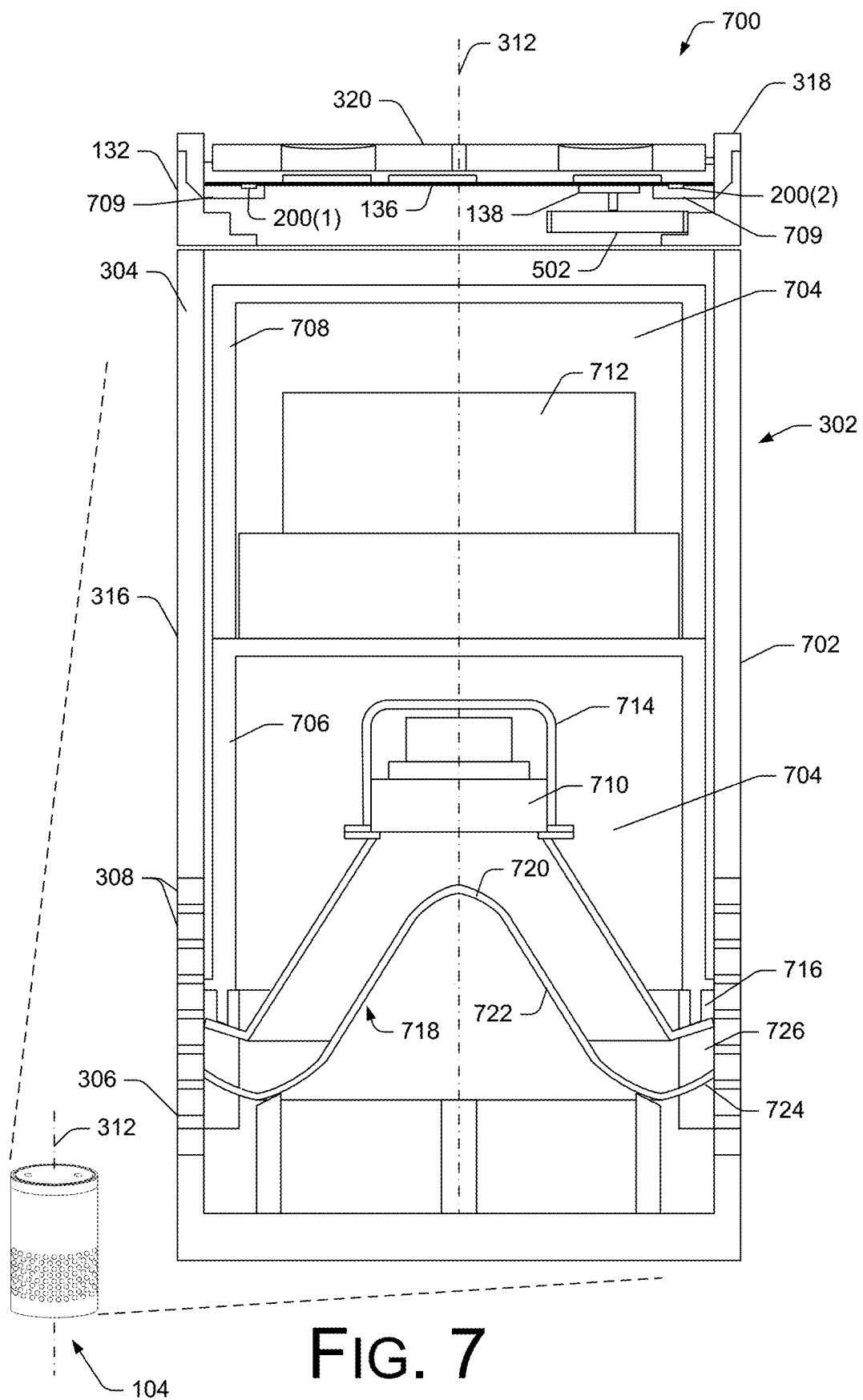
FIG. 7 is a cross sectional view of the voice controlled assistant of FIG. 3 according to one example implementation in which two speakers are coaxially aligned.

FIG. 7 is a cross sectional view 700 of the voice controlled assistant 104 taken along a plane that intersects the center axis 312 of the cylindrical-shaped housing 302. The housing 302 has an elongated, cylindrical-shaped middle section 702 extending between the first, lower or base end 306 and a second, upper, or top end 304. The cylindrical-shaped middle section 702 has a smooth outer surface 316 and due to the rounded shape, the two ends 304 and 306 are circular in shape. The base end 306 is designed to rest on a surface, such as a table 108 in FIG. 1, to support the housing 302. In this position, the top end 304 is distal and upward relative to the base end 306.

The housing 302 defines a hollow chamber 704. Within this chamber 704 are two skeletal members: a first or lower skeletal member 706 that provides structural support for components in the lower half of the chamber 704 and a second or upper skeletal member 708 that provides structural support for components in the upper half of the chamber 704.

The computing components 136 are mounted to the upper skeletal member 708, with one example configuration having the components mounted on a printed circuit board (PCB) positioned just below the end cap 320. The computing components 136 may include any number of processing and memory capabilities, as well as power, codecs, network interfaces, and so forth. Example components are shown in FIG. 2. The PCB may further hold the microphones 126(1)-(M), which are not shown in FIG. 7. It is noted that some or all of the computing components 136 may be situated in other locations within the housing 302.

A light source 200 for the edge pipe 318 may be mounted to the PCB. In one implementation, the light source 200 may be formed as multiple (e.g., 12) multi-colored light sources, such as RGB LEDs. In FIG. 7, two LEDs 200(1) and 200(2), are shown mounted to the PCB 136 and optically connected to a light pipe diffusion ring 709, which is also mounted to the PCB. The light pipe diffusion ring 709 is optically coupled to the edge pipe 318. In this manner, each of the LEDs 200 may emit light in various colors, which is conveyed through the diffusion ring 709 to the edge pipe 318 exposed on the other rim of the knob 132 so that the light ring can be viewed from all directions. In this configuration, the light indicator 132 is composed the light indicator controller 140, the light source 200, and the optical illumination components of the edge pipe 318 and diffusion ring 709.

Two speakers are shown mounted in the housing 302. A first speaker 710 is shown mounted within the lower skeletal member 706. The first speaker 710 outputs a first range of frequencies of audio sound. In one implementation, the first speaker 710 is a mid-high frequency speaker that plays the middle to high frequency ranges in the human-perceptible audible range. A second speaker 712 is shown mounted within the upper skeletal member 708 elevationally above the first speaker 710 with respect to the base end 306. In this implementation, the second speaker 712 is a low frequency speaker that plays the low frequency ranges in the human-perceptible audible range. The mid-high frequency speaker 710 is smaller than the low frequency speaker 712.

The two speakers 710 and 712 are mounted in a coaxial arrangement along the center axis 312, with the low frequency speaker 712 atop the mid-high frequency speaker 710. The speakers are also coaxial along the center axis 312 to the microphone array, or more particularly, to the plane containing the microphone array. The middle microphone 126(7) (not shown in this figure) is positioned at the center point and lies along the center axis 312. Further, the two speakers 710 and 712 are oriented to output sound in a downward direction toward the base end 306 and away from the microphones mounted in the top end 304. The low frequency speaker 712 outputs sound waves that pass through one or more openings in the lower skeletal member 706. The low frequency waves may emanate from the housing in any number of directions. Said another way, in some implementations, the low frequency speaker 712 may function as a woofer to generate low frequency sound waves that flow omni-directionally from the assistant 104.

The mid-high frequency speaker 710 is mounted within a protective shielding 714, which provides a shield to the sound waves emitted from the low frequency speaker 712. Small openings or slots 716 are formed in the lower skeletal member 706 near the base end 306 of the housing 302 to pass sound waves from the chamber 704, although the low frequency waves need not be constrained to these slots.

The mid-high frequency speaker 710 emits mid-high frequency sound waves in a downward direction onto a sound distribution cone 718 mounted to the base end 306. The sound distribution cone 718 is coaxially arranged in the housing 302 along the center axis 312 and adjacent to the mid-high frequency speaker 710. The sound distribution cone 718 has a conical shape with a smooth upper nose portion 720, a middle portion 722 with increasing radii from top to bottom, and a lower flange portion 724 with smooth U-shaped flange. The sound distribution cone 718 directs the mid-high frequency sound waves from the mid-high frequency speaker 710 along the smooth conical surface downward along the middle portion 722 and in a radial outward direction from the center axis 312 along the lower flange portion 724 at the base end 306 of the housing 302. The radial outward direction is substantially perpendicular to the initial downward direction of the sound along the center axis 312. In this manner, the sound distribution cone 718 essentially delivers the sound out of the base end 306 of the housing 302 symmetrical to, and equidistance from, the microphone array in the top end 304 of the housing. The sound distribution cone 718 may also have the effect of amplifying the sound emitted from the mid-high frequency speaker 710.

Slots 726 are formed between the lower skeletal member 706 and the cone 718 to permit passage of the sound waves, and particularly the high frequency sound waves, emitted from the mid-high frequency speaker 710. In addition, apertures 308 are formed in the outer housing 702 to permit emission of the sound waves.

The knob 132 is rotatably mounted at the top end 304 of the housing 302 to rotate about the center axis 312. The knob 132 is mechanically coupled to the complementary gear 502. As the gear rotates, a knob controller 138 outputs a signal indicative of that rotation that may be passed to other modules to control various functions.

Figure 8:
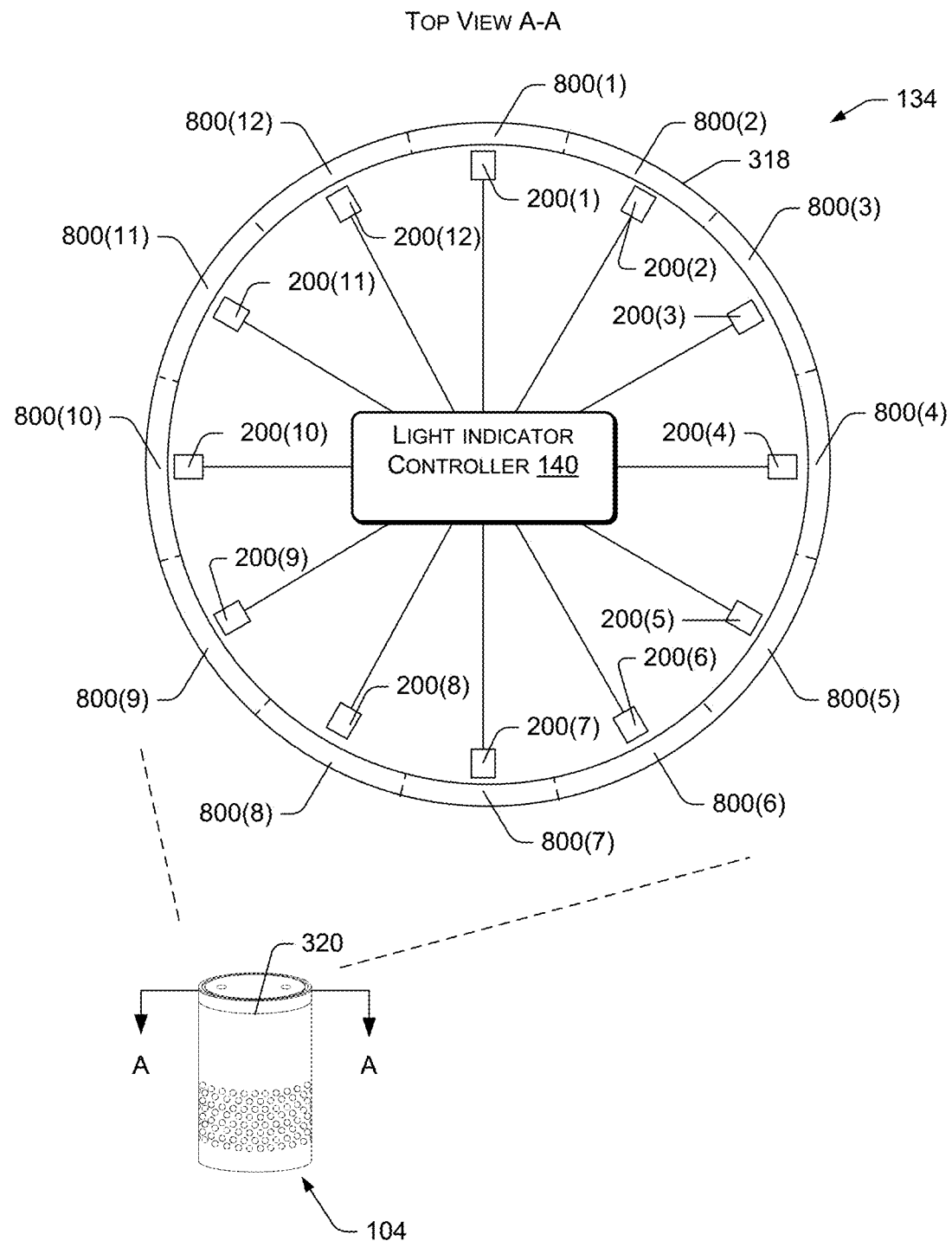
FIG. 8 shows a top down view of the voice controlled assistant of FIG. 3 taken just beneath the outer housing to illustrate one example implementation of a light indicator formed of an array of LEDs used to illuminate multiple segments in a light edge pipe.

FIG. 8 shows a top down view of the voice controlled assistant 104 taken through line A-A just beneath the outer end cap 320 to illustrate one example implementation of the light indicator 134. The light indicator 134 includes the light indicator controller 140 electrically coupled to control an array of multiple LEDs 200(1), . . . , 200(12), which are uniformly arranged about the center axis. The LEDs 200 (1)-(12) are optically coupled to the edge pipe 318 to form twelve illumination segments 800(1), . . . 800(12) that can be selectively illuminated. The light indicator controller 140 individually controls each of the LEDs 200, instructing the LEDs as to color, on/off state, light intensity, timing, and so forth. In this manner, the controller 140 can control the array of LEDs 200(1)-(12) to provide essentially unlimited indication or appearance states.

Figure 9:
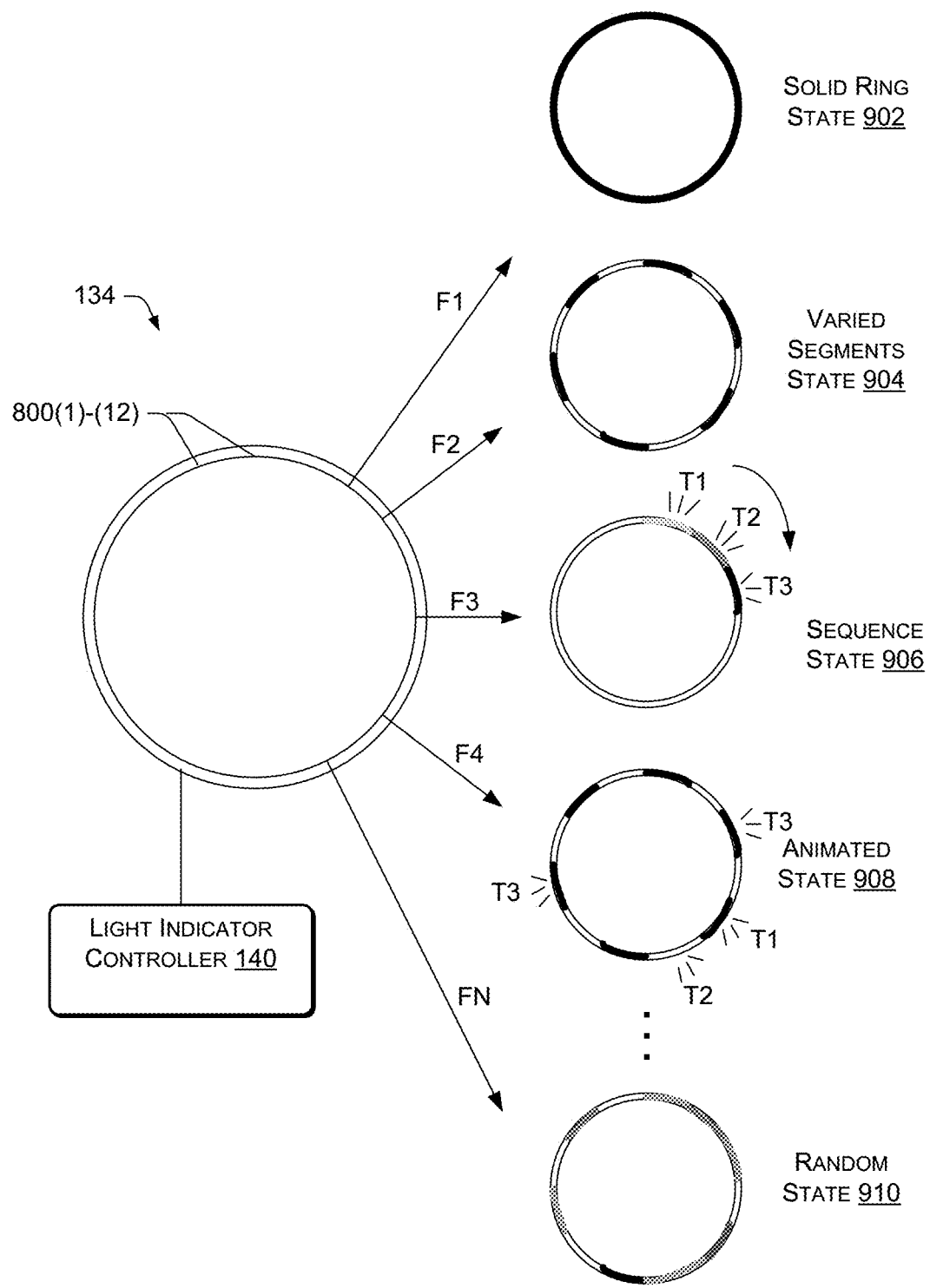
FIG. 9 illustrates a variety of example lighting arrangements that may be exhibited by the light indicator depending upon an associated function.

FIG. 9 shows a variety of example appearance states that may be exhibited by the light indicator 134 depending upon an associated function. Since each of the twelve light segments may be individually controlled with many different color and timing options, there are infinitely many different functions that can be assigned to the appearance states. For instance, in this illustration, N functions F1, F2, FN are associated with different types of appearance states that involve timing of segment illumination. Varying colors of each segment within each of these examples adds another dimension of appearance states that might be used to represent available functions.

In FIG. 9, one example appearance state involves turning on all of the light segments 800 concurrently to produce a solid ring 902. A first function F1 may be assigned to the solid ring 902, or multiple functions may be mapped to associated color variations of the solid ring 902. For instance, a solid green ring may represent a normal "on" state, and a solid red ring may represent a mute condition. Another appearance state might include turning the solid ring 902 on and off, so that the indicator appears to blink. This may represent yet another function, such as when the assistant 104 receives a voice message or is in call waiting. In some cases, different colors may be used to represent different people who left messages, with the colors being personalized by the user to represent different individuals.

Another example appearance state involves varying which segments are turned on or off, as represented by the varied segments state 904. Here, some of the segments may be off while other segments are one. Any number of combinations of the twelve segments may be used to create various appearance states to which functions, such as function F2, can be assigned. These varied segment states may be assigned, for example, to functions such as alerts, reminders, calendars, and such.

Still another example appearance state is the sequence state 906 where segments are turned on and off in a sequence. For instance, in FIG. 9, a function F3 may be associated with a sequence that begins with segment 800(1) and turns on subsequent light segments 800(2), 800(3), etc. in a clockwise manner at times T1, T2, T3, etc. One suitable function that might be associated with a sequence state 906 is to provide visual feedback while the user adjusts the control knob 132. The user may, for example, adjust the volume of the voice controlled assistant 104 by rotating the knob 132 clockwise. In response, the light indicator controller 140 may direct the LEDs 200 to illuminate the segments 800 in a sequential pattern of 800(1), 800(2), . . . , and so on. In another example, this sequence state appearance may be used for a timer function, where the light sequence slowly turns off in reverse order as time expires.

The sequence appearance state 906 may also be used for measurement related functions, such as temperature or barometer readings. For instance, the user may ask the voice controlled assistant 104 to provide the current temperature in the room or at a remote vacation resort. As an example, the user may ask, "What is the temperature in Maui?" In response, the controlled assistant 104 will determine the correct response (locally or via a query to the cloud services) and provide an audio response. For instance, the assistant 104 may respond, "The weather in Maui is 86 degrees". As part of this response, the light indicator controller 140 may use the sequence appearance state to turn on nine LEDs with a red color to illuminate the corresponding segments 800(1)-800(9) so that three-quarters of light indicator ring is red, thereby visually conveying to the user a hot temperature measure akin to a thermometer.

Another example appearance state is the animated state 908 where segments are turned on and off to provide an animation effect. For instance, in FIG. 9, a function F4 may be associated with an appearance where segment 800(5) is illuminated at time T1, segment 800(6) at time T2, and segments 800(3) and 800(9) at time T3. The animated appearance state 908 may be used for essentially any associated function, with examples being an alert, a warning, intruder detection, receipt of communication from a pre-identified person, and so forth.

Yet another example appearance state is the random state 910 where segments are turned on and off, at different colors, in a pseudo-random manner. Again, the random appearance state 910 may be used for essentially any associated function, with one example being for merely decorative purposes for music playback.

The appearance states provided in FIG. 9 are merely representative examples and are not intended to be limiting in any way. For instance, appearance states may be coordinated with a calendar application running on the assistant 104 (or in the cloud services). A color scheme or animation pattern may be selected based on a specific date. During Christmas season, red and green colors may be used more prominently, whereas an orange/black color palette is selected during Halloween and a red/white color palette is selected for Valentine's Day. Another calendar item may be a person's birthday, which may introduce fun animated states that are activated together with the playing of a song for "Happy Birthday". In such cases, the illumination may be for purely decorative reasons. Furthermore, although the description refers to the LEDs as being on or off, such LEDs may be controlled through various levels of brightness or grayscale to provide an even more varied appearance. In another example appearance state, the light indicator may operate in a directional state in which at least some of the LEDs are illuminated to exhibit a direction of input or output of the audio sound. For instance, when a user is speaking, the LED segments on the side of the rim closest to the user may be illuminated to indicate that the audio sound is being received from that direction.

In some implementations, there may be two or more voice controlled assistants in the same room or area. In these cases, the light indicators may be coordinated through inter-device communication (e.g., Bluetooth, Wi-Fi, LAN, etc.) or via a central computing node, such as the cloud services. For instance, multiple assistants may be used to convey equalizer information where each assistant represents an associated band. In another situation, games may be played across multiple devices, where the light indicator is lit to identify which assistant is active during game play. In still another situation, a customized visualization or warning directed to one user may be transferred among multiple assistants as the user physically moves from one assistant toward another assistant (e.g., such as walking across a room, or from one room to the next). A multi-assistant system is discussed below in more detail with reference to FIG. 12.

Figure 10:
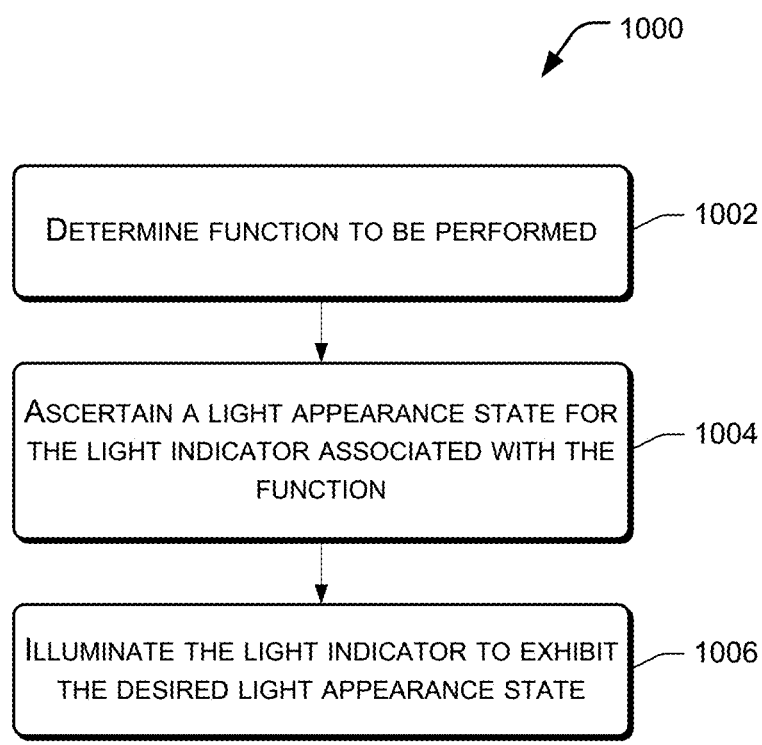
FIG. 10 is a flow diagram showing an illustrative process of operating the voice controlled assistant of FIG. 1.

FIG. 10 is a flow diagram of an illustrative process 1000 to operate a communication device, such as the voice controlled assistant 104. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For purposes of discussion, the process 1000 is described with reference to the voice controlled assistant 104. However, the process may be performed by other electronic devices.

At 1002, a function to be performed, which might benefit from visual feedback to the user, is determined. The function may be of any number of types, such as operation-based functions (e.g., power, mute, volume, etc.), application-driven functions (e.g., calendar events, reminders, alerts, etc.), communication-related functions (e.g., call waiting, voicemail notice, etc.), security-related functions (e.g., sound detection within an environment when in a security mode), entertainment functions (e.g., music, movie sounds, audio books, etc.), and so forth.

At 1004, a corresponding light appearance state for the light indicator is ascertained based on the function. The light indicator is capable of producing a wide range of visual appearances by varying which segments are on/off, the respective colors of the segments, and the timing of activating the segments. Different visual appearances may be mapped or otherwise assigned programmatically to the functions.

At 1006, the light indicator is configured to exhibit the light appearance state. In the implementation described above, the light indicator controller 140 controls the individual LEDs 200 to selectively emit light of a specified color at one or more specified times to achieve the desired appearance state. As a result, the edge pipe 318 of the knob 132 is selectively illuminated to provide visual feedback of the function being performed. Example appearance states are discussed above with reference to FIG. 9.

Figure 11:
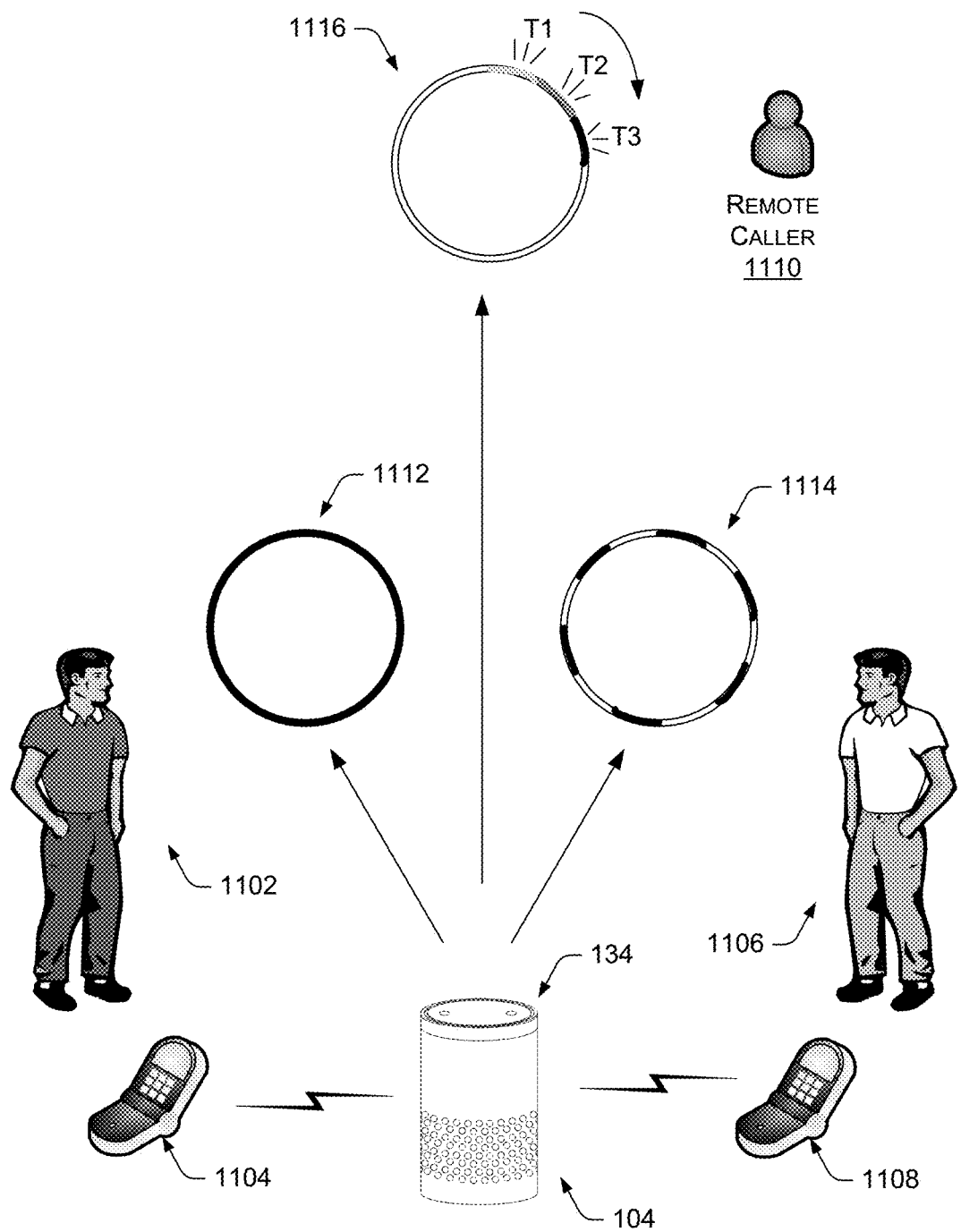
FIG. 11 illustrates an example implementation of the voice controlled assistant in which the light indicator is configured to be used for caller identification.

FIG. 11 shows an example implementation of the voice controlled assistant 104 in which the light indicator 134 is configured to be used for caller identification. In this illustration, a first user 1102 has a first communication device 1104 and a second user 1106 has a second communication device 1108. Through a local wireless connection (e.g., Bluetooth), the first and second communication devices 1104 and 1108 are communicatively coupled to the voice controlled assistant 104. A remote caller 1110 is also shown in FIG. 11 and that remote caller 1110 may contact either of the first and second users 1102 and 1106, who may also be considered as recipients of the caller's communication.

Each of the parties—first user 1102, second user 1106, and remote caller 1110—may be associated with one of the appearance states of the light indicator. This association may be maintained, for example, in the memory 204 of the voice controlled assistant 104. In FIG. 11, the first user 1102 has an associated first appearance state of 1112 (e.g., solid ring color), the second user 1106 has an associated second appearance state 1114 (e.g., different color segments), and the remote caller has an associated third appearance state 1116 (e.g., a sequential pattern).

When the remote caller 1110 calls the first user 1102 on the communication device 1104, the communication device 1104 may transfer the audio input/output functionality to the voice controlled assistant 104. Upon doing this, the voice controlled assistant 104 determines an identity of the first user 1102 from the communication device 1104 and may further determine (or receive from the communication device 1104) an identity of the remote caller 1110. The processor 202 of the assistant 104 uses these identities to retrieve the associated appearance states, and then directs the light indicator to output the appropriate appearance state. For instance, the light indicator 134 may emit the first appearance state 1112 associated with the first user 1102 when receiving the call, or emit the third appearance state 1116 associated with the remote caller 1110, or cycle between the two appearance states to identify both parties on the call.

Similarly, when the remote caller 1110 calls the second user 1106 on the communication device 1108, the communication device 1108 may communicate with the voice controlled assistant 104 to offload the audio input/output functionality to the assistant 104. The voice controlled assistant 104 determines an identity of the second user 1106 from the communication device 1108 and may further determine (or receive from the communication device 1108) an identity of the remote caller 1110. The processor 202 of the assistant 104 uses these identities to retrieve the associated appearance states, and then directs the light indicator 134 to output the appropriate appearance state. The light indicator 134 may emit the second appearance state 1114 associated with the second user 1106 when receiving the call, or emit the third appearance state 1116 associated with the remote caller 1110, or cycle between the two appearance states.

Figure 12:
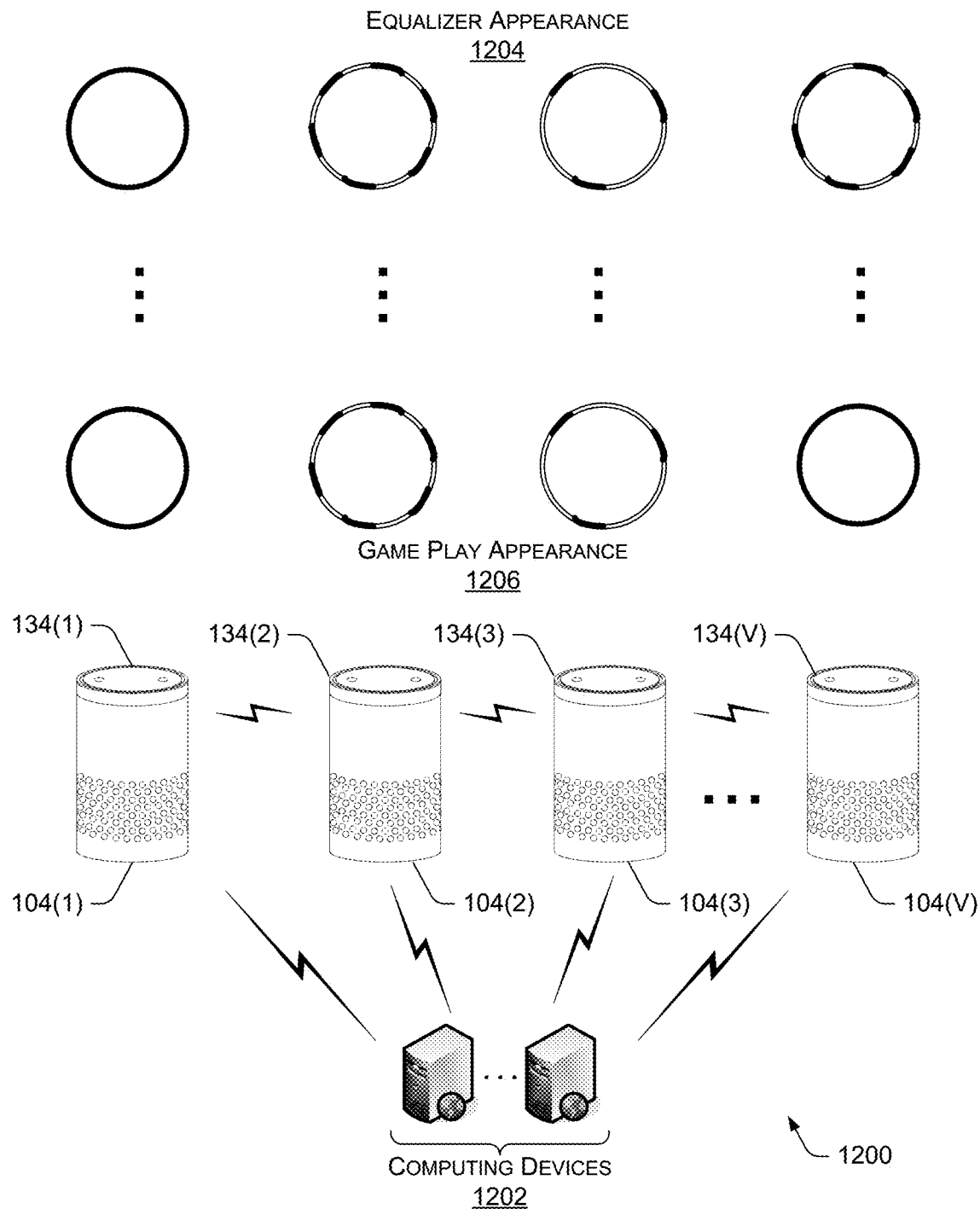
FIG. 12 illustrates a system with multiple voice controlled assistants communicatively coupled to communicate with one another and to coordinate output of their respective light indicators to produce combined visual appearances.

FIG. 12 shows a system 1200 having multiple voice controlled assistants 104(1), 104(2), 104(3), . . . , 104(V). The assistants 104(1)-(V) may be communicatively coupled via a local area network, such as Bluetooth, LAN, or Wi-Fi. Additionally, or alternatively, the assistants 104(1)-(V) may be connected to communicate with one or more local or remote computing devices 1202 that are separate from the assistants 104(1)-(V). The multiple voice controlled assistants 104(1)-(V) are coordinated via the inter-device communication or via the computing device(s) 1202 so that the light indicators 134(1)-(V) on respective assistants 104(1)-(V) exhibit different appearance states that collectively yield a combined visual appearance. Each of the voice controlled assistants 104(1)-(V) may independently use any of the appearance states discussed above with reference to FIG. 9. These various appearance states may then be coordinated to provide a collective visual display that provides different information to the user. For instance, inter-device timing may be added to provide unique visual displays, where one light indicator on a first assistant emits an appearance in synchronization with, or at timed bursts relative to, another light indicator on another assistant.

In FIG. 12, two usage scenarios are illustrated for discussion purposes, although many other scenarios are possible. In one scenario, the set of voice controlled assistants 104(1)-(V) are configured to collectively output music or other multi-band audio. The assistants 104(1)-(V) may further allow adjustment of the frequency bands, similar to the functionality performed by an audio equalizer. As part of this operation, the light indicators 134(1)-(V) of the voice controlled assistants 104(1)-(V) may be associated with different frequency bands to provide visual feedback of the equalization levels of the associated bands. For instance, the light indicators may exhibit a range in colors where one color represents a low equalization level and another color represents a high equalization level, with various colors in between. Alternatively, each light indicator may show a single segment on for a low equalization level and all segments on for a high equalization level.

Collectively, the light indicators of the voice controlled assistants 104(1)-(V) provide an equalizer appearance 1204 that informs the user of the various equalization levels of the frequency bands. A user may adjust the levels of the frequency bands and receive visual feedback as the light indicator for that band changes appearance states. Furthermore, in some implementations, individual equalization levels may be adjusted by the corresponding control knob of the assistant 104 assigned to that frequency band.

In another scenario, the set of voice controlled assistants 104(1)-(V) may be configured to collectively provide a game play appearance 1206 during an audio-based game. For instance, the user may be playing a dance game where music is played from the assistants 104. Individual or sets of the light indicators 134(1)-(V) are then lit or animated in patterns to direct the user to make adjustments throughout the dance (e.g., change orientations, pace, or dance steps). Similarly, illuminating different light indicators of multiple individual voice controlled assistants may be used to control the various exercise stages.

There scenarios are merely representative. Many others are possible, including such scenarios as using the multiple light indicators in a coordinated fashion to convey temperature information, or volume information, or a timer, or audio controls (fade, balance, etc.), and so forth.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
one or more microphones;
a light indicator;
a loudspeaker;
one or more processors; and
one or more non-transitory computer-readable media storing instructions that, when executed, cause the one or more processors to perform operations comprising:
receiving, from a mobile device associated with a user, a first indication associated with a call being received by the mobile device;
causing output of a second indication associated with the call via at least one of the light indicator or the loudspeaker;
receiving, via the one or more microphones, first audio data representing first speech input of the user associated with answering the call;
sending, based at least in part on receiving the first audio data, an instruction to the mobile device;
receiving, from the mobile device and based at least in part on the instruction, second audio data representing second speech input of a caller associated with the call; and
causing output of the second audio data via the loudspeaker.

2. The device of claim 1, the operations further comprising:
receiving, via the one or more microphones, third audio data representing third speech input of the user; and
sending, to the mobile device, third audio data representing the third speech input.

3. The device of claim 1, the operations further comprising determining, based at least in part on receiving the first indication, an identifier associated with the caller, wherein the second indication comprises the identifier.

4. The device of claim 1, wherein the second indication comprises an identifier associated with user.

5. The device of claim 1, the operations further comprising determining that the mobile device is within a threshold distance of the device, and wherein receiving the first indication is based at least in part on the mobile device being within the threshold distance.

6. The device of claim 1, the operations further comprising receiving, from the mobile device, a third indication associated with outputting audio on the device, and wherein causing output of the second indication is based at least in part on receiving the third indication.

7. The device of claim 1, wherein the second indication comprises a first appearance state output on the light indicator, the operations further comprising causing output of a third indication via the light indicator, wherein the third indication comprises a second appearance state via the light indicator based at least in part on receiving the first audio data.

8. A method comprising:
receiving, at a first device from a second device, first data associated with a call being received by the second device;
causing, at the first device, output of a first indication associated with the call via at least one of a light indicator or a loudspeaker associated with the first device;
receiving, at the first device, first audio data representing speech input associated with a first user answering the call;
sending, to the second device, second data associated with the first user answering the call, wherein the second data causes the second device to forward second audio data associated with the call to the first device;
receiving, from the second device, the second audio data representing speech of a second user associated with the call; and
causing output of the second audio data via the loudspeaker.

9. The method of claim 8, further comprising determining that the second device is within a threshold distance of the first device, and wherein receiving the first data is based at least in part on the second device being within the threshold distance.

10. The method of claim 8, further comprising:
receiving, at the first device, third audio data representing sound captured in an environment of the first device; and
sending, from the first device to the second device, third data representing the sound.

11. The method of claim 8, wherein at least one of the first data or the first indication is associated with at least one of:
a phone number of the second user;
an identity of the second user; or
an identity of the first user.

12. The method of claim 8, further comprising based at least in part on receiving the first data, determining an identity associated with the second user, and wherein the first indication is associated with the identity.

13. The method of claim 8, further comprising causing output of a second indication via the light indicator based at least in part on receiving the first audio data.

14. The method of claim 13, wherein:
the first indication comprises a first appearance state output via the light indicator; and the second indication comprises a second appearance state output via the light indicator, the second appearance state being different than the first appearance state.

15. A device comprising:
a light indicator;
a loudspeaker;
one or more processors; and
one or more non-transitory computer-readable media storing instructions that, when executed, cause the one or more processors to perform operations comprising:
receiving, from a mobile device, data associated with a call being received by the mobile device;
causing the light indicator to output a first indication associated with the call;
causing the loudspeaker to output a second indication associated with the call;
receiving a command associated with answering the call;
sending a third indication to the mobile device, the third indication causing the mobile device to send audio data associated with the call to the device;
receiving the audio data from the mobile device; and
causing the loudspeaker to output audio associated with the audio data.

16. The device of claim 15, wherein:
the first indication comprises an appearance state of the light indicator that is associated with at least one a recipient of the call or a caller of the call; and
the second indication comprises second audio that is associated with the at least one of the recipient or the caller.

17. The device of claim 15, further comprising one or more microphones, the operations further comprising receiving, via the one or more microphones, second audio data representing the command.

18. The device of claim 15, further comprising:
receiving second audio data representing sound captured in an environment of the device; and
sending, from the device to the mobile device, the second audio data.

19. The device of claim 15, the operations further comprising receiving a third indication associated with the mobile device being within a threshold distance of the device, and wherein receiving the data is based at least in part on the mobile device being within the threshold distance.

20. The device of claim 15, wherein sending the third indication is based at least in part on receiving the command.

* * * * *